(12) United States Patent
Hill (10) Patent No.: US 6,513,053 B1
(45) Date of Patent: Jan. 28, 2003

(54) DATA PROCESSING CIRCUIT AND METHOD FOR DETERMINING THE FIRST AND SUBSEQUENT OCCURENCES OF A PREDETERMINED VALUE IN A SEQUENCE OF DATA BITS

(75) Inventor: Stephen John Hill, Austin, TX (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 09/481,438

(22) Filed: Jan. 12, 2000

(51) Int. Cl.[7] ............................................... G06F 7/00
(52) U.S. Cl. ..................... 708/210; 708/211; 712/225
(58) Field of Search ............................ 708/200, 210, 708/211; 712/225

(56) References Cited

U.S. PATENT DOCUMENTS

| | | |
|---|---|---|
| 4,247,891 A | 1/1981 | Flynn et al. |
| 4,926,309 A | 5/1990 | Wu et al. |
| 4,926,369 A | 5/1990 | Hokenek et al. |
| 5,040,138 A | 8/1991 | Maher, III |
| 5,111,415 A | 5/1992 | Shackleford |
| 5,204,825 A | 4/1993 | Ng |
| 5,241,490 A | 8/1993 | Poon |
| 5,317,527 A | 5/1994 | Britton et al. |
| 5,390,307 A * | 2/1995 | Yoshida ........................ 712/225 |
| 5,421,029 A * | 5/1995 | Yoshida ........................ 712/209 |
| 5,493,520 A | 2/1996 | Schmookler et al. |
| 5,764,557 A * | 6/1998 | Hara et al. .................... 708/523 |
| 5,809,282 A | 9/1998 | Cooper et al. |

* cited by examiner

Primary Examiner—Chuong Dinh Ngo
(74) Attorney, Agent, or Firm—Nixon & Vanderhye P.C.

(57) ABSTRACT

An apparatus and method is provided for determining locations of a predetermined value in a sequence of data bits. Each location is determined independently of the others thereby allowing them to be found more quickly. This has particular application to block memory loads and block stores to memory, wherein ones in the register list in the instruction word indicate the registers to be loaded or stored. Thus, in these applications the present invention enables the positions of these ones to be determined quickly.

40 Claims, 8 Drawing Sheets

| INDEX | ENTRY |
|---|---|
| 7 | |
| 6 | |
| 5 | |
| 4 | |
| 3 | 5 |
| 2 | 4 |
| 1 | 2 |
| 0 | 0 |

Fig. 6B

| INDEX | ENTRY |
|---|---|
| 7 | |
| 6 | |
| 5 | |
| 4 | |
| 3 | |
| 2 | |
| 1 | |
| 0 | 7 |

Fig. 6C

| INDEX | ENTRY |
|---|---|
| 7 | 7 |
| 6 | 6 |
| 5 | 5 |
| 4 | 4 |
| 3 | 3 |
| 2 | 2 |
| 1 | 1 |
| 0 | 0 |

DATA PROCESSING CIRCUIT AND METHOD FOR DETERMINING THE FIRST AND SUBSEQUENT OCCURENCES OF A PREDETERMINED VALUE IN A SEQUENCE OF DATA BITS

BACKGROUND OF THE INVENTION

1. Field of the Invention

This invention relates generally to a data processing circuit and method for determining locations of a predetermined value in a sequence of data bits.

2. Description of the Prior Art

In data processing there are many circumstances in which it is helpful to know the locations of a predetermined value in a sequence of data bits. For example, the number of leading zeros in a sequence of data bits needs to be determined in many floating point implementations (see for example U.S. Pat. No. 5,040,138). Further, knowing the number of leading zeros, or in other words the position of the first logic one value, in an operand can increase the speed of arithmetic operations performed on the operand. U.S. Pat. No. 5,111,415 discloses an asynchronous leading zero counter for calculating the number of leading zeros of an operand in order to increase arithmetic processing speed. It comprises a plurality of leading zero detector cells of like kind arranged in an array that provides a digital output word having a magnitude indicative of the leading zero count (and thus the position of the first logic one value) on the inputs to the plurality of cells.

Similarly, in an ARM processor (as designed by ARM Limited), a find first one and find next one is a fundamental part of implementing LDM instructions (block data loads from memory) and STM instructions (block data stores to memory). These vector instructions operate with a register list, which is a 16 bit field in the instruction in which each bit corresponds to a register. A logic 1 value in bit 0 of the register field indicates that register R0 is to be transferred, while a logic 0 value indicates that it is not to be transferred; similarly bit 1 controls the transfer of register R1 and so on. Thus, to implement these instructions it is necessary to perform a very fast find first 1, and sometimes find second 1, on up to 16 bits.

Figure 1:
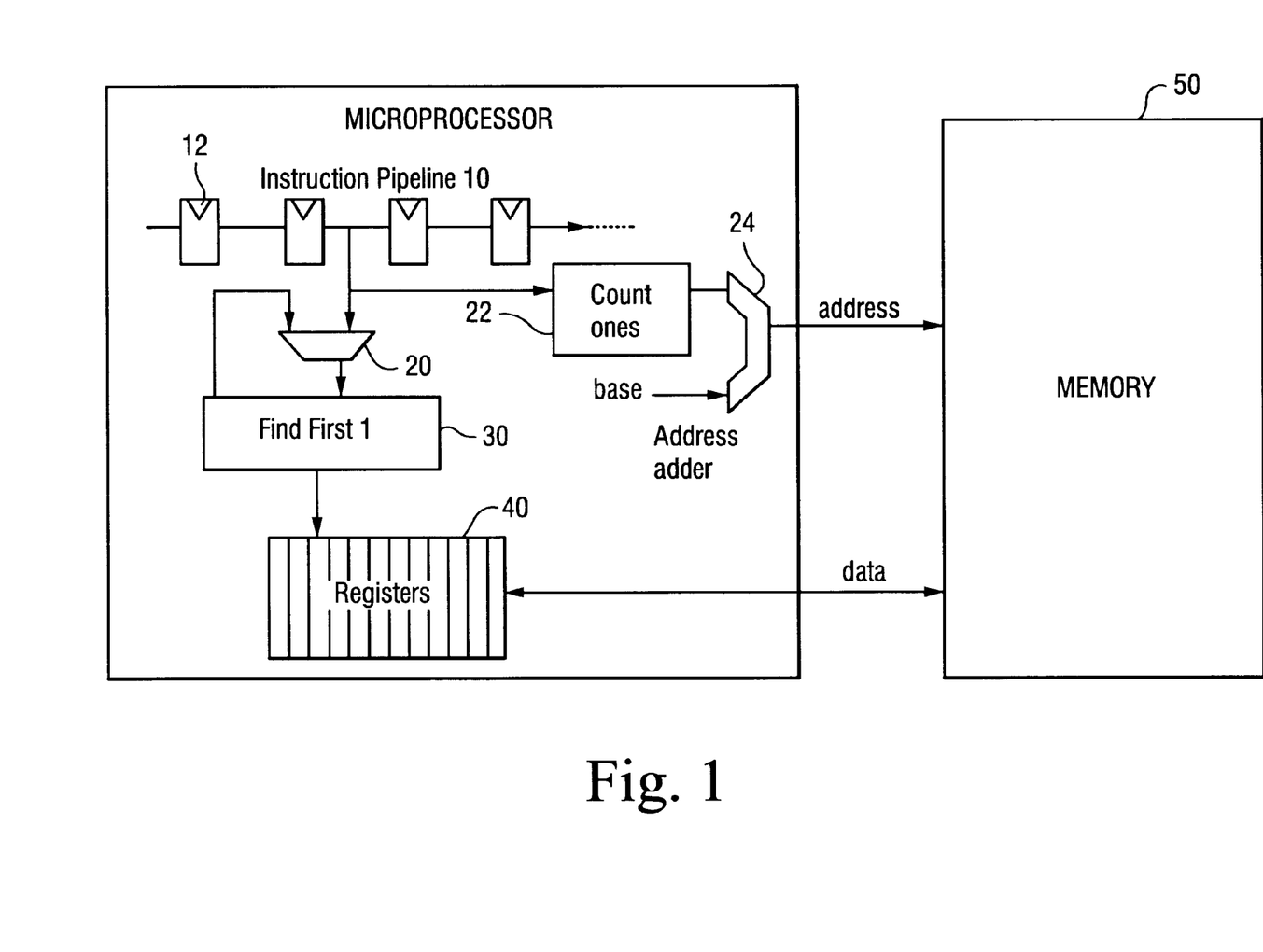
FIG. 1 is a block diagram of a prior art find-first-one data processing circuit for load multiple or store multiple implementations.
Figure 2:
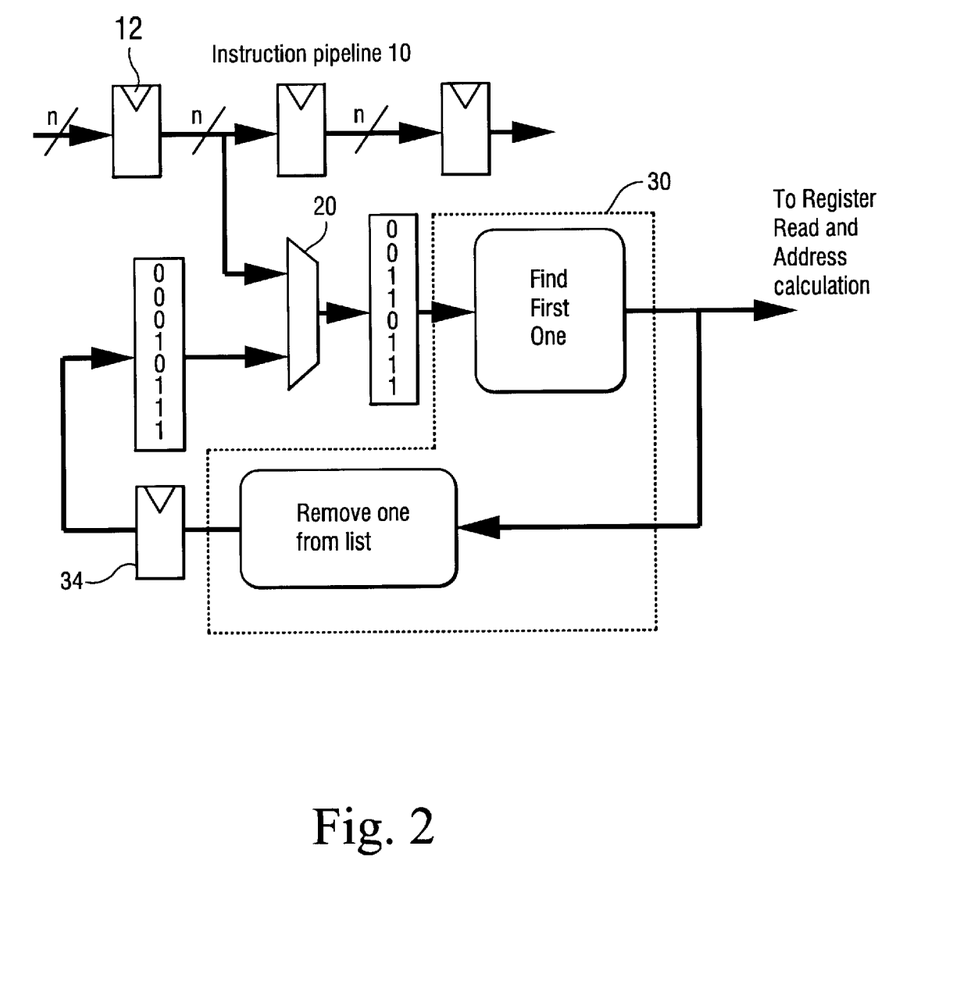
FIG. 2 is a logic diagram of a find-first-one per cycle implementation according to a known prior art technique.

A conventional way of determining find first one followed by find next one for block loads and stores is illustrated in FIGS. 1 and 2. The sequence of data bits in which the first one is to be detected is referred to herein as a "vector", and arrives in the instruction pipeline 10 at the start of the decode cycle. The location of the first one in the vector is needed by the time register reads occur. FIG. 1 shows an instruction pipeline 10 with a multiplexer 20 connected to the instruction pipeline 10 and a find first 1 circuit 30 connected to the output of the multiplexer 20. The vector in which the first one is to be detected travels through the latches 12 of the instruction pipeline 10 and during one pipelined stage (in preferred embodiments the decode stage) is taken via the multiplexer 20 to the find-first-one circuit 30. This circuit finds the first one in the vector and outputs the location as a 4 bit binary number to register bank 40 to identify a particular register in the register bank. Further, the find first one circuit 30 is arranged to mask the first one in order to generate a revised vector, and to return this revised vector to the multiplexer 20. The instruction containing the vector will also include a base address, which is passed to the address adder 24, from where it is output to the memory 50. Hence, this address will identify the memory location in the memory 50 whose contents are to be loaded into the particular register identified by the find first one circuit 30 in the case of an LDM instruction, or will identify the address to which the contents of the register specified by the find first one circuit 30 are to be stored in the case of an STM instruction.

The address adder 24 is also arranged to receive as an input the output of a circuit 22 provided to count the number of logic one values in the original vector. This enables the adder to calculate the memory addresses from which data is to be loaded or to which data is to be stored. During the next iteration of the process, the multiplexer 20 is arranged to pass the revised vector to the find first one circuit 30, such that the location of the next one is output to register bank 40 to identify a corresponding register in the register bank. Further, on this iteration, the address adder 24 is arranged to increment the base address and to provide the incremented address to the memory 50. Accordingly, in this next iteration, the next register is identified, and the next memory location is also identified, thereby enabling the load or store process to be repeated based on the new register and new memory address. This sequence is repeated several times until all logic one values have been found in the vector, and accordingly all load or store operations have been performed.

The find first one circuit, giving an example vector, is shown in greater detail in FIG. 2, in which like parts have like reference numerals. In the example shown a vector 11101100 is input to the find first one circuit 30. The location of the first one (bit 2 in this case) which specifies the first register to be transferred is then output to register bank 40. The find first one circuit 30 also acts to mask the first one that has been found in the original vector and outputs to the latch 34 a revised vector 11101000. This revised vector with the first one masked is then re-input in the next cycle via the multiplexer 20 into the find-first-one circuit 30 and the first one in this vector is then found, this being in effect the second one of the original vector. This step is then repeated until all ones are found. Thus, in each cycle the find-first-one circuit 30 operates on the output vector from the previous cycle.

An example, showing an 8 bit vector for clarity is shown below, where bit 0 is the first bit and bit 7 the last.

Bit position 7 6 5 4 3 2 1 0
for vector 0 0 1 1 0 1 0 1

| cycle | Input at start of decode stage | output |
| --- | --- | --- |
| 1 | 00110101 | 0 and 00110100 |
| 2 | 00110100 | 2 and 00110000 |
| 3 | 00110000 | 4 and 00100000 |
| 4 | 00100000 | 5 and 00000000 |

As is shown above, vector 00110101 is input to the pipeline at the start of decode. The location of the first logic one value at bit position 0 is determined and this location along with a revised vector, being the original vector with the first one (in bit 0) masked, i.e. vector 00110100, is output in a single clock cycle. In the next clock cycle the vector output from the previous calculation i.e. 00110100 is input to the find first one circuit and the position of the first logic one value in this vector is found, i.e. 2. This result is then output along with a further revised vector, being the revised vector with the first one masked, this vector being used as the input vector in the next clock cycle. Thus, in this example, at the end of four clock cycles all of the logic one values have been found and their positions output.

Figure 3:
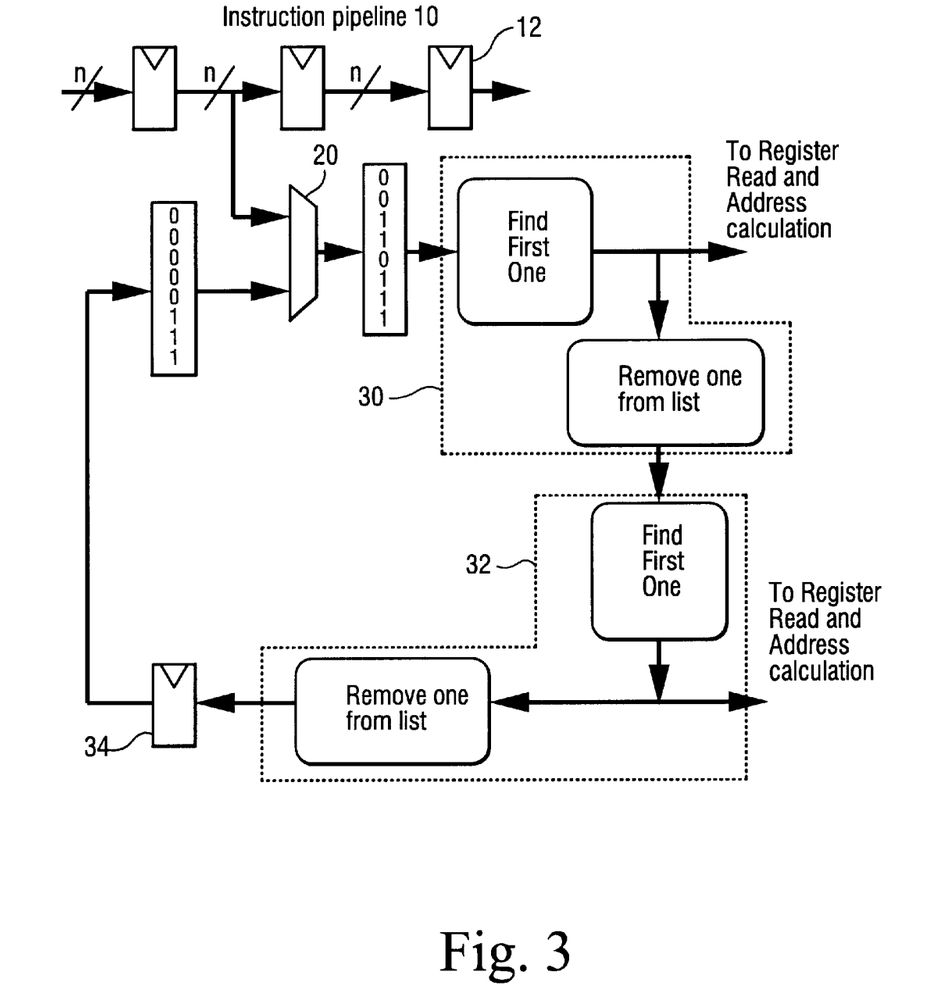
FIG. 3 is a logic diagram of a known find-first and -second-one implementation.

This works well provided that you only need to do one find first one per cycle. However, to increase processing speed, it may be desirable to execute instructions which require two logic one value values to be determined in a single cycle. For example, it would be desirable to execute LDM instructions, which can load two registers in a single cycle. Thus, find first one and find second one would need to be performed in one cycle. FIG. 3 illustrates a circuit for finding first and next one, while FIG. 4 shows a flow diagram of such a circuit.

FIG. 3 is very similar to FIG. 2, except that there are two identical find first one circuits 30, 32 arranged in series. The original input vector passes from the instruction pipeline 10 through multiplexer 20 to the first find one circuit 30. The first one in the input vector is found and its location output, this logic one value is then masked and a revised vector with the logic one value masked is sent to the next find first one circuit 32. This circuit finds the first logic one value in the revised vector (which corresponds to the second logic one value in the original vector), outputs its location and then masks this logic one value, and outputs a further revised vector via a register 34 back to the multiplexer 20. Thus, provided the circuitry is able to operate quickly enough, it might be possible to use this circuit to find two logic one values in a single clock cycle.

Figure 4:
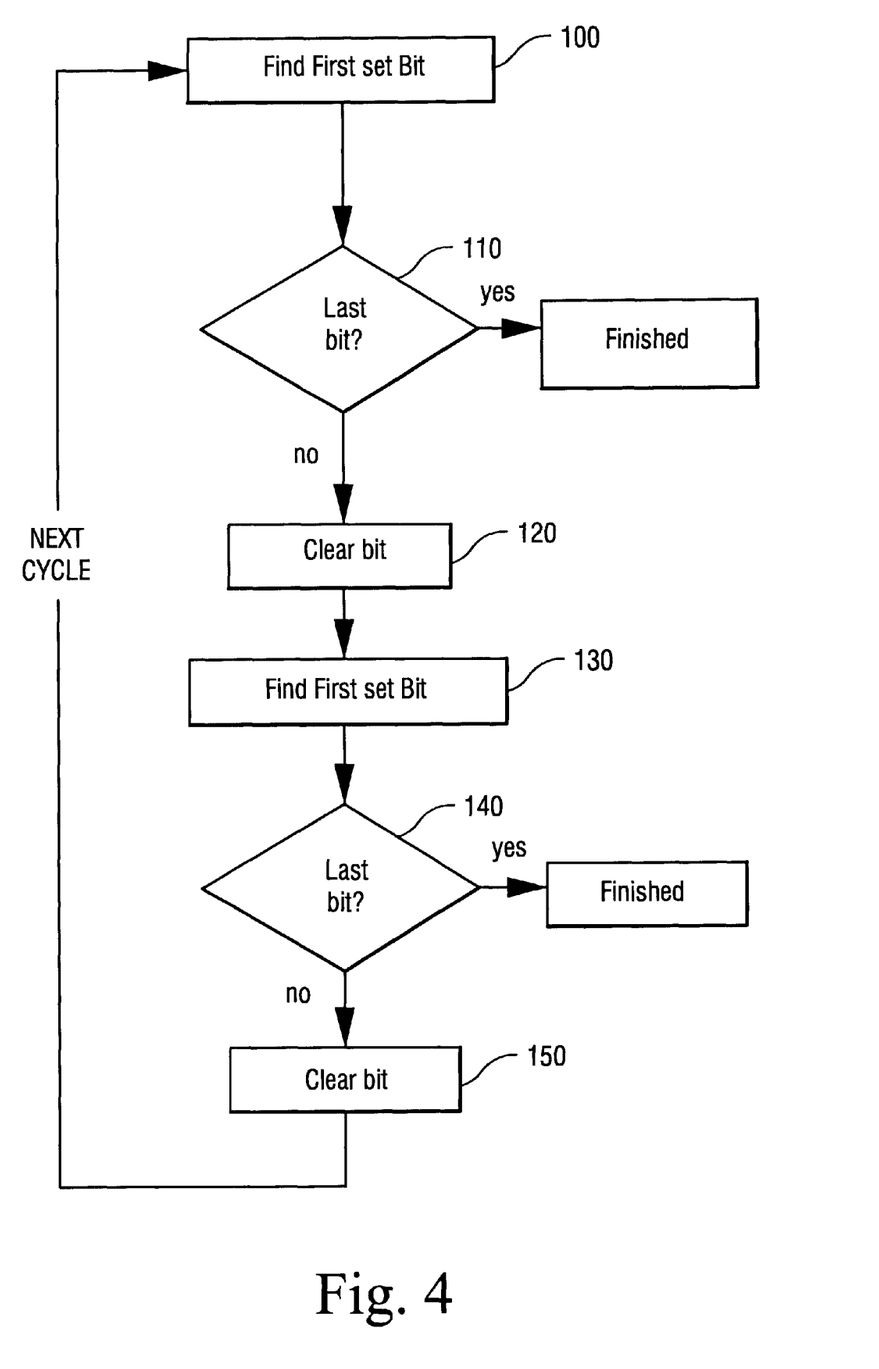
FIG. 4 is a flow diagram for a conventional find first and second one implementation.

A flow diagram showing the conventional find first and second one implementation of FIG. 3 is given in FIG. 4. In block 100 the first one is found, and block 110 then determines if this is the last bit in the data sequence or not. If it is then the process finishes, if not it proceeds to block 120, wherein the one that has been found is masked or cleared. In block 130 the first one in the masked vector is found, which in effect is the second one in the original vector. Block 140 determines if this is the last bit or not and if it is the process finishes. If not then this bit is masked or cleared at block 150 and a revised vector is output. This vector is then returned to step 100, where the process is repeated.

An example showing how the circuit and flow diagram work for a given vector, 00110101 is shown below.

| Cycle | Input to find first one (ff1) | Output of ff1 | Input to find second one (fs1) | Output of fs1 |
|---|---|---|---|---|
| 1 | 00110101 | 0 and 00110100 | 00110100 | 2 and 00110000 |
| 2 | 00110000 | 4 and 00100000 | 00100000 | 5 and 00000000 |

As can be seen, 00110101 is input to the find first one circuit 30 in clock cycle one (block 100 of FIG. 4). The first logic one value in this vector is located and its position (bit zero) is output along with a revised vector 00110100, which is the original vector with the logic one value at bit zero being masked (block 120). This is input to the second find first one circuit 32, which locates the first logic one value in this vector (block 130) and output its location, bit position 2, along with a revised vector (block 150) having this logic one value masked. Thus, in the first cycle the first two logic one values in the original vector are located and output, along with a revised vector having these two logic one values masked. This revised vector is then input into the circuit again and the position of the next two logic one values is located in the next cycle, and so on until no further logic one values are found (block 110 or 140).

The drawback of this circuit is that the two find first one circuits must operate in series and hence two logic one values are found one after the other, the output of the first find one circuit 30 being required before the second find first one circuit 32 can operate. Thus, in order to complete these two operations in a single cycle these circuits need to be made to run very fast or the cycle length needs to be lengthened.

SUMMARY OF THE INVENTION

Figure 5:
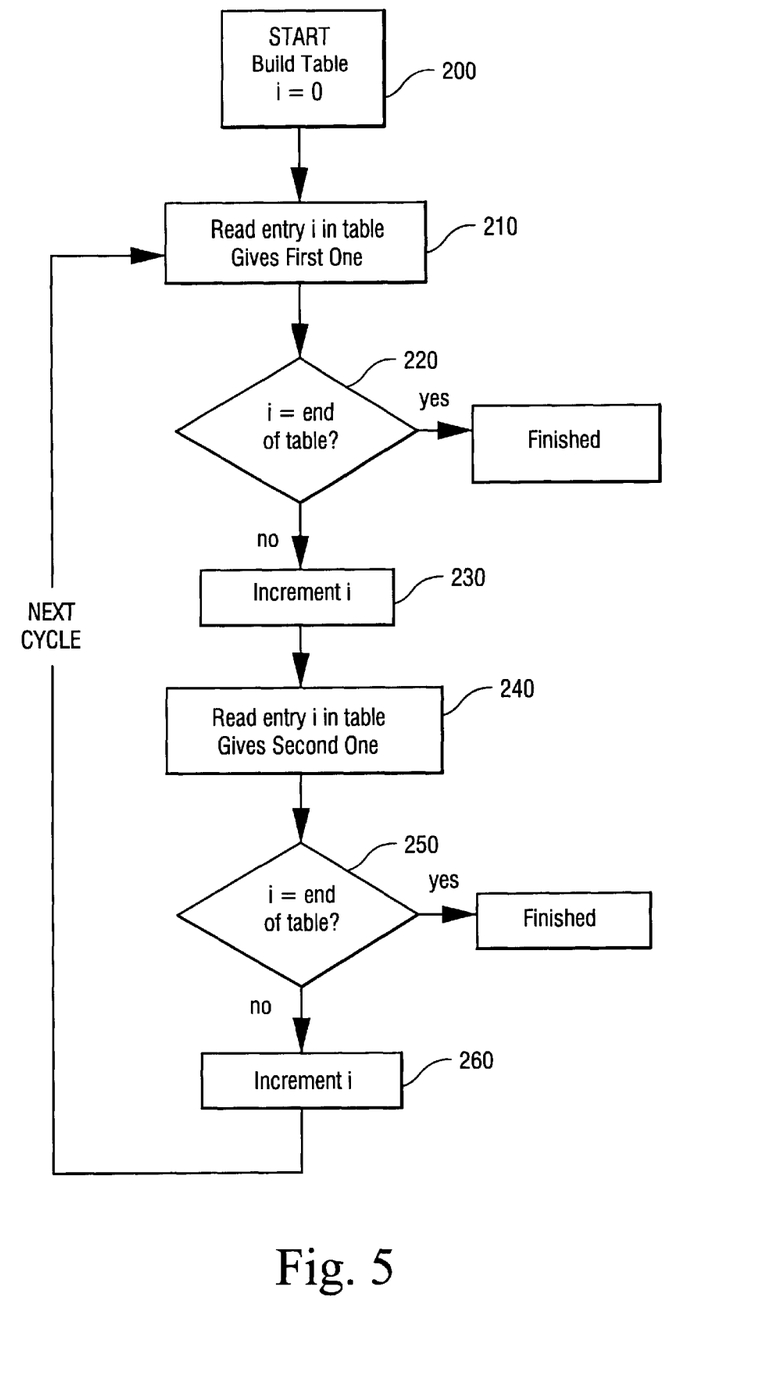
FIG. 5 illustrates a flow diagram of a hypothetical find first and second one implementation involving the building of a table.
Figure 6A:
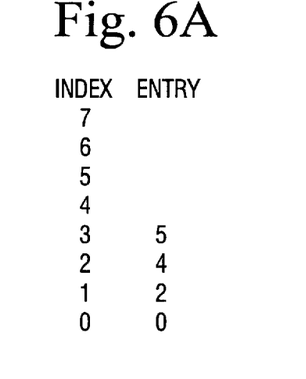
FIGS. 6A to 6C illustrate tables constructed following the steps shown in the flow diagram of FIG. 5.
Figure 6B:
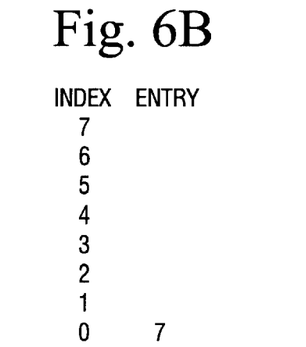
Figure 6C:
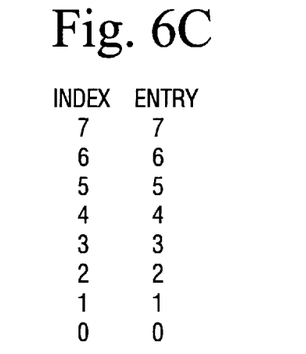

One possible way of addressing the problem of finding more than one location of a predetermined value in a sequence of data bits in one clock cycle, would be to build a table identifying locations in the sequence of data bits of that predetermined value. This table could then be indexed and the positions of the predetermined values read out very quickly. FIG. 5 shows a flow diagram illustrating this idea where the predetermined value is a logic one value. The table is first constructed in block 200, and is then indexed in the following blocks. Starting, for example, at i=0 the first entry in the table which gives the location of the first one is read at block 210. Block 220 checks that i does not correspond to the end of the table. If it does the routine finishes, if not i is incremented at block 230 and the i+1th position of the table is read at block 240. Block 250 checks that incremented i does not correspond to the end of the table. If it does the routine finishes, if not, i is incremented again at block 260 and the process continues from the start of the flow diagram in the next cycle. FIGS. 6A–6C show examples of what the tables would look like for three different vectors, FIG. 6A being the table for the vector 00110101, FIG. 6B being the table for the vector 10000000, and FIG. 6C being the table for the vector 11111111. As can be seen, the table has an entry for each possible location of the logic 1 value and is filled from position zero up as ones are found.

As is clear from the above, once the table is built it is indeed very quick and easy to index and read from the table. Unfortunately, the building of the table takes a lot of time, the building of the table simply being an extension of the find first one followed by find next one for each entry in the table one after the other. Thus, the provision of a table that can be indexed would not seem to overcome the problem of the prior art, since with the above apparatus it takes too long to generate the table.

Viewed from one aspect, the present invention provides a data processing circuit for determining locations of a predetermined value in a sequence of data bits comprising: a first store for receiving said sequence of data bits; and an analyser operable to determine a first location of said predetermined value nearest a first end of said sequence of data bits and to store in a second store a location indicator identifying said first location; for each of a number of potential locations of said predetermined value in said sequence of data bits, said analyser further being operable to: (i) identify a next location of said predetermined value further from said first end of said sequence than said potential location; and (ii) store in a third store in association with said potential location a location indicator for said next location.

As each step for identifying location of the predetermined values is not dependent on the outcome of any other step, then each can be performed independently of the others. This provides potential for decreasing the time required for completing the steps.

Preferably, the analyser is operable to perform steps (i) and (ii) in parallel for each potential location. Performing the steps in parallel means that in the time required to locate a single predetermined value, a plurality of predetermined values can be determined. This decreases the time required to locate a plurality of predetermined values.

Advantageously, the data processing circuit further comprises a reader operable to: (a) read said first location indicator in order to identify said first location of said predetermined value; (b) determine the potential location corresponding to said first location; (c) read the location indicator associated with said potential location in order to determine a next location of said predetermined value.

The storing of a next location indicator for each potential location may lead to some redundancy, for example in the case of 10010000 where the first location of a one is at location 4, and this same information is also recorded associated with locations 0, 1, 2 and 3. This is the cost of finding the locations in parallel. However, by stepping through the data in the way described above, the redundant data is missed in the read out stage. In the above example, the location indicator associated with the first location would be 4, thus the location indicator associated with location 4 would be read next and location indicators stored at locations 0, 1, 2 and 3 would be skipped. This is a very efficient way to access the stored data.

Preferably, the reader is further arranged to d) determine the potential location corresponding to said next location; (e) read the location indicator associated with said potential location determined at step (d) in order to determine a next location of said predetermined value; (f) repeat steps (d) and (e).

In preferred embodiments the reader is operable to repeat steps (d) and (e) until detection of said potential location comprises an end indicator. The use of an end indicator improves the efficiency of the process by stopping it from continuing once the predetermined value furthest from the first end has been found.

Indexing the information in the above manner is an efficient way of accessing all the relevant information.

In preferred embodiments, the analyser comprises a number of value locating circuits, each value locating circuit being arranged to determine a location of said predetermined value. Advantageously, the analyser comprises a value locating circuit corresponding to each of said number of potential locations, and a value locating circuit for determining said first location, preferably the value locating circuits being arranged in parallel. By having a number of value locating circuit, each arranged to determine a particular location of a predetermined value, the circuits can operate for their particular locations independently of each other. By arranging the circuits in parallel they can operate simultaneously.

Although in some embodiments the first location indicator of the predetermined value is stored separately to the other location indicators for other instances of said predetermined value, in other embodiments it is stored alongside them in the same storage means. This storage means may be located locally within the data processing circuit or it may be located separately to it, the data processing circuit transferring data to this external storage means.

Preferably, the analyser is operable to write said potential locations and said location indicators to said third store in the form of a table,s each entry in the table comprising potential locations and associated next location indicators. This is a convenient and easy way to store and access the data.

In preferred embodiments, the value locating circuits are synchronous circuits and said data processing circuit further comprises a clock for clocking said synchronous circuits. This data processing circuit lends itself particularly well to synchronous circuits, whereby owing to the independent nature of the steps, the analyser may identify and write said locations to said third data store during one cycle of said clock.

Although the data processing circuit may find the location of any predetermined value, in preferred embodiments it finds logic one value values. There are many applications where the positions of logic one values are required to be known and the data processing circuit of an embodiment of the present invention is particularly well adapted at locating them.

Although the data processing circuit of embodiments of the present invention may be arranged to find locations from either end of a data sequence, preferably it finds occurrences of the predetermined value starting from the end of the sequence representing the least significant bit.

Preferably, upon determination of no further occurrences of said predetermined value in said sequence of data bits, said analyser is operable to generate an end indicator and to store said end indicator as said location indicator in said third store in association with the corresponding potential location.

By recording an end indicator once the location for the predetermined value furthest from the first end has been found, further steps to look for further values may be avoided and thus the efficiency of the data processing circuit improved.

In preferred embodiments, said location indicators comprise a string of bits and said end indicator comprises a string of zeros of the same length as said string of bits.

The end indicator can take any form provided that the data processing circuit is adapted to recognise it. As it is stored in the position of a location indicator, it preferably has the same form as a location indicator. In preferred embodiments the location indicators comprise four bit numbers. In this case, therefore any four bit number that is not used as a location indicator in the third store would be appropriate as an end indicator. Where the first end is the least significant bit, the only location indicator that may reference the location of the least significant bit (bit zero) is the one for the first location, which in many embodiments is stored separately to the other location indicators. Thus, in these embodiments the location indicator for bit zero (e.g. 0000) could not occur in the table of the other locations, and it is therefore a good choice as an end indicator. Clearly other values that could not occur could also be used.

In preferred embodiments, the sequence of data bits are embedded in a microprocessor instruction, for example a microprocessor LOAD or STORE instruction.

The data processing circuit of the present invention is particularly well adapted for block loads from memory and block stores to memory, wherein it is necessary to find the location of a plurality of logic one values in a sequence of data bits in as short a time as possible.

Viewed from a second aspect the present invention provides a method of determining locations of a predetermined value in a sequence of data bits comprising the steps of: (a) determining a first location of said predetermined value nearest a first end of said sequence of data bits; (b) storing a first location indicator identifying said first location; (c) identifying potential locations for said predetermined value in said sequence of data bits; (d) for each identified potential location (i) determining the next location of said predetermined value further from said first end of said sequence than said potential location; (ii) storing in association with said potential location a location indicator identifying said next location.

The above, and other objects, features and advantages of this invention will be apparent from the following detailed description of illustrative embodiments which is to be read in connection with the accompanying drawings.

BRIEF DESCRIPTION OF THE DRAWINGS

The present invention will be described further, by way of example only, with reference to preferred embodiments thereof as illustrated in the accompanying drawings, in which.

DESCRIPTION OF THE PREFERRED EMBODIMENTS

Figure 7:
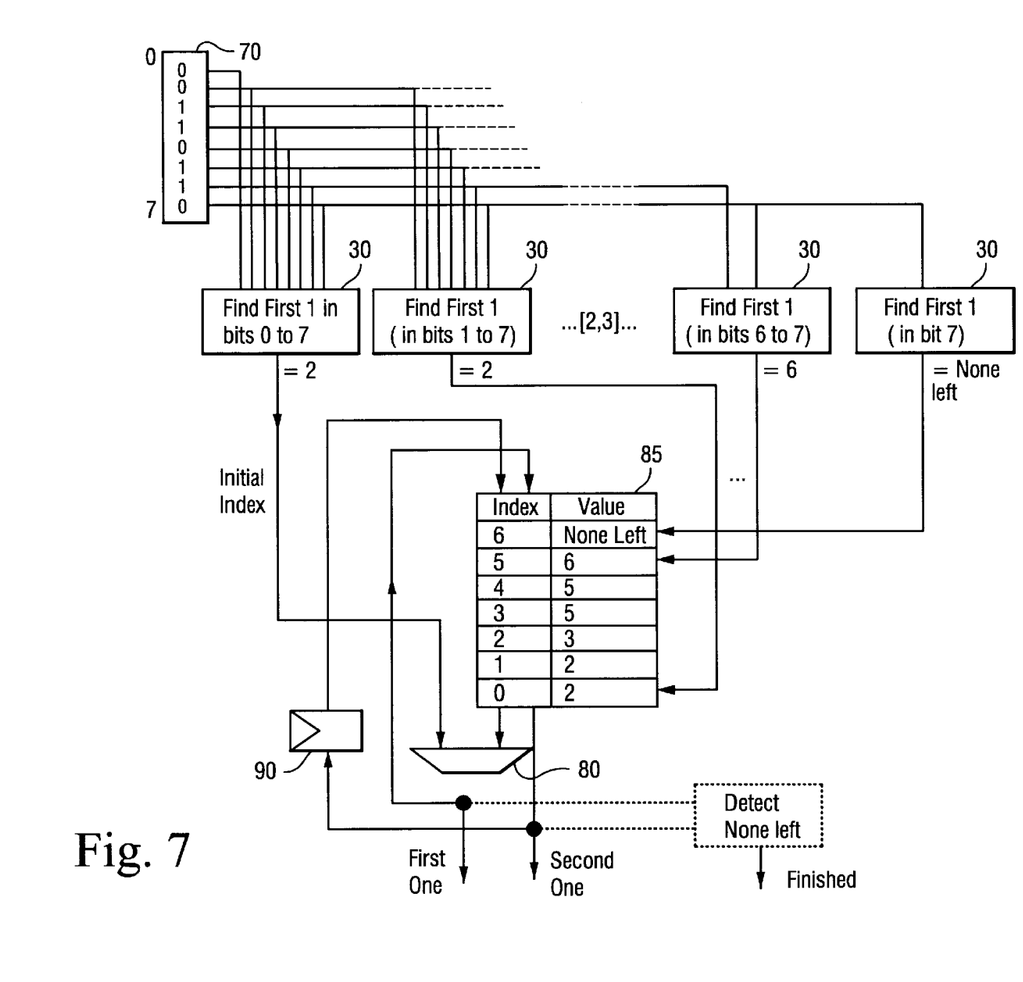
FIG. 7 illustrates a find first and subsequent one apparatus according to an embodiment of the invention.

FIG. 7 illustrates a find first and next one apparatus according to an embodiment of the invention. In this embodiment the predetermined values to be located are logic one values and they are present in a sequence of data bits in a vector within a block data transfer vector instruction. For the sake of clarity, a vector comprising eight bits will be considered, each bit corresponding to a register that may be transferred (loaded with new data or data in it stored to memory). A logic one value in the appropriate bit of the vector indicates that the register so indicated is to be transferred, whereas a logic zero value indicates that it is not to be transferred.

Referring to FIG. 7, the apparatus comprises a register 70 and a plurality of value locating circuits 30. A vector comprising the sequence of data bits in which the position of the logic one values is to be found is entered in register 70. Different portions of this vector are read by respective value locating circuits 30. In the embodiment illustrated, these value locating circuits are conventional find-first-one circuits. They are arranged in parallel such that a first value locating circuit 30 reads the complete vector and finds the first one, in this example the one nearest the lsb, the next value locating circuit reads the complete vector minus the lsb and finds the first one in that vector and so on. That is to say, the first value locating circuit finds the first location of the predetermined value (in this case a logic one value) nearest a first end (in this example the lsb) of the sequence of data bits and outputs this value. The other value locating circuits identify, for each of a number of potential locations (in this case all except the msb), a next location of the predetermined value further from the lsb than the potential location and store these in conjunction with an index identifying the potential location in a table 85. Hence, as an example, the location stored in the table at index 1 indicates the position of the next logic one value looking down the vector from the lsb to the msb from bit position 1, and not including the bit at bit position 1, i.e. in the example given a "2" will be written in association with index 1.

In this embodiment, there are as many value locating circuits 30, as there are bits in the data sequence. As these circuits are arranged in parallel and operate independently of each other they can each locate the first one in the portion of the vector supplied to them in a single clock cycle.

The first logic one value found in the complete vector may be output and stored separately as in this embodiment. In other embodiments it may be stored at a suitable point in the table.

Thus, a table 85 indicating the position of logic one values in the vector can be produced in a single clock cycle. When it is desired to read the first one information (e.g. in the cycle following the building of the table), the position of the first one is output via multiplexer 80 and its position is also fed round to table 85 and is used to index the table. In other words the entry in the table whose index corresponds to the location of the first one is read and the position of the logic one value that is stored in this entry is output as the next one. In the example shown, the location of the first one is thus 2 is output by the multiplexer 80 and index position 2 of the table is accessed. This gives a value of 3 and thus 3 is output as the position of the second one. This value passes back to the table via latch 90 and in the next clock cycle the index position of the table corresponding to the location of the second one (3) is read (giving 5) and is output via multiplexer 80 as the location of the third one. This value (5) is then fed back to the table and the index position corresponding to it is read and this value (6) corresponding to the fourth one is output. This process continues until a "none left" is detected, which in this case would occur in the next cycle.

Figure 8:
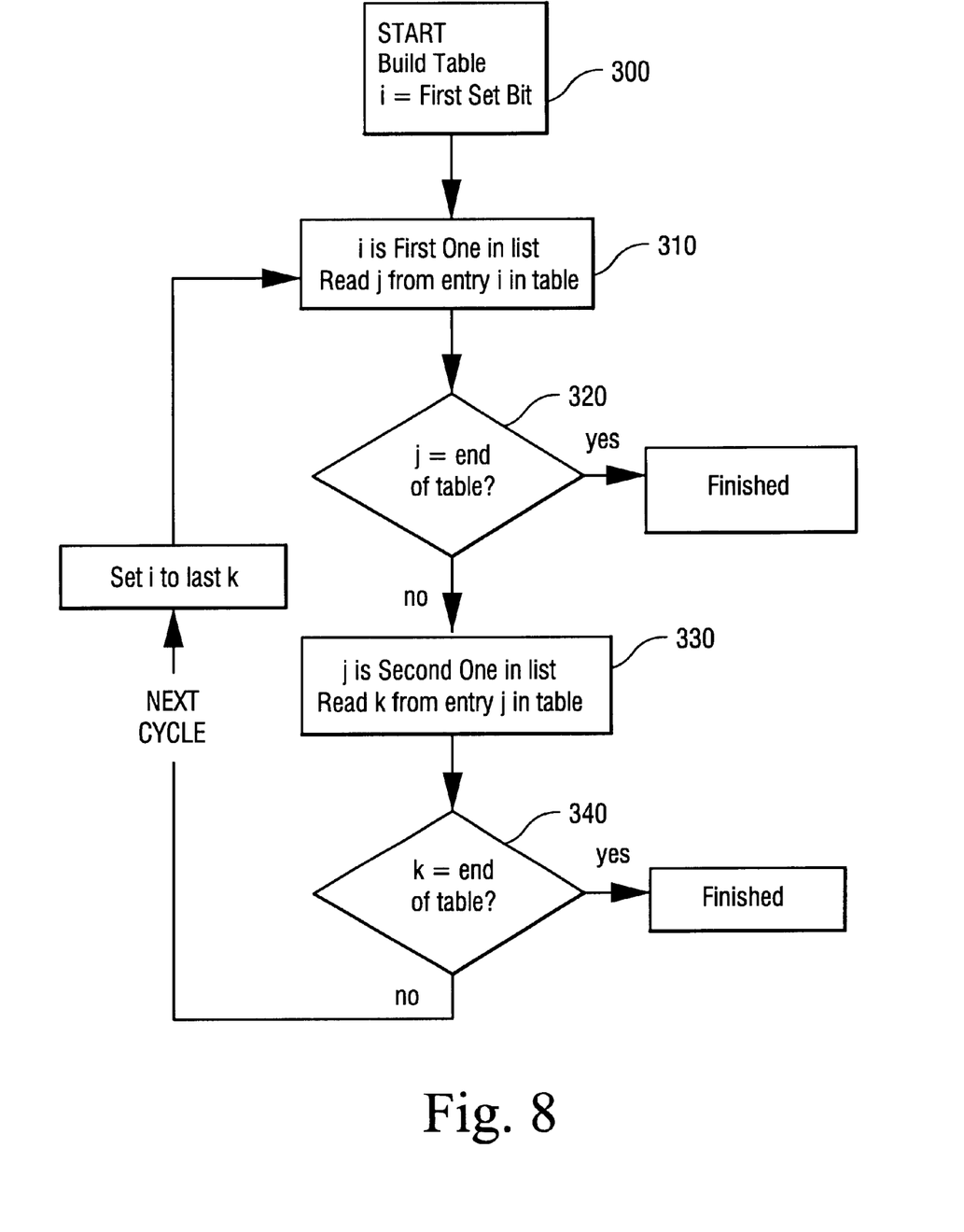
FIG. 8 illustrates a flow diagram for find first and subsequent one implementation according to an embodiment of the invention.

A flow diagram illustrating how hardware according to an embodiment of the invention would perform the process of reading a table such as that constructed in FIG. 7 is shown in FIG. 8. As can be seen the table is built in one clock cycle at block 300 and the parameter i is set to equal the location of the first logic one value. The location of the first one is output at block 310 and the index position of the table corresponding to the location of the first one is accessed and the location indicator stored at this position is read. Block 320 checks to see if this location indicator corresponds to the end of the table. If it does the routine finishes, if not, this location indicator which indicates the position of the second one is output at block 330. Also at block 330 the index position of the table corresponding to this location indicator is accessed and the location indicator that is stored there and that indicates the location of the next logic one value is read from the table. Block 340 checks it to see if this location indicator corresponds to the end of the table. If it does the routine finishes, if not the process starts again in the next cycle from block 310 with the location of the first one now being the location of the one just found, in this case the third one. This continues until an "end" indicator is detected at either step 320 or 340.

An example of such a table and how it is indexed for vector 00110101 is given below. Here, as in the FIG. 7 example, the first one is taken to be the one nearest the least significant bit (i.e. bit zero) of the vector.

The table built in block 300 of FIG. 8 would look like this:

| Index | Entry |
|-------|-------|
| 6 | end |
| 5 | end |
| 4 | 5 |
| 3 | 4 |
| 2 | 4 |
| 1 | 2 |
| 0 | 2 |

In addition a location indicator of 0 is output identifying the location of the first one. There is no table entry for index 7, as there can never be a logic one value further from the lsb than bit 7, bit 7 being the msb of the vector.

Thus, i being the "first set bit" in FIG. 8 would be 0. So position 0 would be output at block 310 and the index position 0 would be accessed and the location indicator stored there, in this case 2, would be read. This is not an end indicator, so the process would continue to block 330, where 2 would be output and the index position 2 of the table accessed and location indicator 4 read. This is not an end indicator, so the process would proceed to the next cycle and 4 would be output at block 310 and the index position 4 of the table accessed. The location indicator 5 would be read from here, this is not an end indicator, thus the process continues to block 330 where this value is output and the index position 5 of the table is accessed and the location indicator stored there, end, is read. This value causes the process to finish at step 340. A table summarising these steps is shown below.

| Cycle 1 | Build table | read first = 0 |
|---------|-------------|----------------|
| Cycle 2 | output first = 0, read entry 0 = 2 | output second = 2, read entry 2 = 4 |
| Cycle 3 | output third = 4, read entry 4 = 5 | output fourth = 5, read entry 5 = end |

An end table indicator may take a number of forms, although it will have the same format as the location indicators as it is stored in their position. In this embodiment the location indicators comprise four bit numbers that indicate the bit position. Thus, an end indicator may be any four bit number that is not used in the table to indicate a bit position, providing the circuit is set up to recognise it as such. Hence a four bit zero number may be used in situations where the location of the first logic one value is stored separately from the table and the first end of the data sequence is the least significant bit, since this value cannot occur in the table. In an alternative embodiment where the first end of the data sequence is the msb, then the end indicator could be a 7, i.e. 111.

It is of course possible to store more information in the table than just the location of the next logic one value. For example, information such as more than one logic one value left, or last logical one could be stored. Alternatively, a whole column of second-one entries could be stored in the table so that the location of two logic one values could be found for a single table look-up. Forming these more complex tables does of course take more time and thus it is only possible if there is more time available in the cycle used to generate the table than in the one that uses it.

Although particular embodiments of the invention have been described herein, it will be appreciated that the invention is not limited thereto and additions thereto may be made within the scope of the invention. For example, various combinations of the features of the following dependent claims can be made with the features of the independent claims without departing from the scope of the present invention.

What is claimed is:

1. A data processing circuit for determining locations of a predetermined value in a sequence of data bits comprising:
   a first storage for receiving said sequence of data bits; and
   an analyser operable to determine a first location of said predetermined value nearest a first end of said sequence of data bits and to store in a second storage a location indicator identifying said first location;
   for each of a number of potential locations of said predetermined value in said sequence of data bits, said analyser further being operable to:
   (i) identify a next location of said predetermined value further from said first end of said sequence than said potential location; and
   (ii) store in a third storage in association with said potential location a location indicator for said next location.

2. A data processing circuit according to claim 1, wherein said analyser is operable to perform steps (i) and (ii) in parallel for each potential location.

3. A data processing circuit according to claim 1, further comprising:
   a reader operable to:
   (a) read said first location indicator in order to identify said first location of said predetermined value;
   (b) determine the potential location corresponding to said first location;
   (c) read the location indicator associated with said potential location in order to determine a next location of said predetermined value.

4. A data processing circuit according to claim 3, wherein the reader is further operable to:
   (d) determine the potential location corresponding to said next location;
   (e) read the location indicator associated with said potential location determined at step (d) in order to determine a next location of said predetermined value;
   (f) repeat steps (d) and (e).

5. A data processing circuit according to claim 4, wherein the reader is operable to repeat said steps (d) and (e) until detection of said potential location comprises an end indicator.

6. A data processing circuit according to claim 1, wherein said analyser comprises a number of value locating circuits, each value locating circuit being arranged to determine a location of said predetermined value.

7. A data processing circuit according to claim 6, wherein said analyser comprises a value locating circuit corresponding to each of said number of potential locations and a value locating circuit for determining said first location.

8. A data processing circuit according to claim 7, wherein said value locating circuits are arranged in parallel with each other to enable all locations of said predetermined value to be determined in parallel.

9. A data processing circuit according to claim 1, wherein said second storage is comprised within said third storage.

10. A data processing circuit according to claim 1, wherein said analyser is operable to write said potential locations and said location indicators to said third storage in the form of a table, each entry in the table comprising a potential location and the associated next location indicator.

11. A data processing circuit according to claim 1, wherein said value locating circuits are synchronous circuits and said data processing circuit further comprises a clock for driving said synchronous circuits.

12. A data processing circuit according to claim 11, wherein said analyser is operable to identify and to write said locations of said predetermined value to said third storage during one cycle of said clock.

13. A data processing circuit according to claim 1, wherein said predetermined value is a logic one value.

14. A data processing circuit according to claim 1, wherein said first end of said sequence comprise the least significant bit of said sequence of data bits.

15. A data processing circuit according to claim 1, wherein upon determination of no further occurrences of said predetermined value in said sequence of data bits, said analyser is operable to generate an end indicator and to store said end indicator as said location indicator in said third storage in association with the corresponding potential location.

16. A data processing circuit according to claim 15 wherein said location indicators comprise a string of bits and said end indicator comprises a string of zeros of the same length as said string of bits.

17. A data processing circuit according to claim 1, wherein said sequence of data bits are embedded in a microprocessor instruction.

18. A data processing circuit for performing a block load from memory to a set of registers, wherein the registers to be loaded are identified by predetermined values in a sequence of data bits, the locations of the predetermined values being determined by a data processing circuit according to claim 1.

19. A data processing circuit for performing a block store to memory from a set of registers, wherein the registers to be stored in memory are identified by predetermined values in a sequence of data bits, the locations of the predetermined values being determined by a data processing circuit according to claim 1.

20. A method of determining locations of a predetermined value in a sequence of data bits comprising the steps of:
(a) determining a first location of said predetermined value nearest a first end of said sequence of data bits;
(b) storing a first location indicator identifying said first location;
(c) identifying potential locations for said predetermined value in said sequence of data bits;
(d) for each identified potential location
(i) determining the next location of said predetermined value further from said first end of said sequence than said potential location;
(ii) storing in association with said potential location a location indicator identifying said next location.

21. A method according to claim 20, wherein said step (d) is performed in parallel for each identified potential location.

22. A method according to claim 20, wherein said steps (a) and (b) are performed in parallel with said steps (c) and (d).

23. A method according to claim 20, further comprising the steps of:
(e) reading said first location indicator in order to determine said first location of said predetermined value;
(f) determining the potential location corresponding to said first location;
(g) reading the location indicator associated with said potential location in order to determine a next location of said predetermined value.

24. A method according to claim 23, further comprising the steps of:
(h) determining the potential location corresponding to said next location;
(i) reading the location indicator associated with said potential location-determined at step (h) in order to determine a next location of said predetermined value;
(j) repeating steps (h) and (i).

25. A method according to claim 24, wherein steps (h) and (i) are repeated until said location indicator comprises an end indicator.

26. A method according to claim 24, wherein said steps (h), (i) and (j) are performed in one clock cycle.

27. A method according to claim 23, wherein said steps (e), (f) and (g) are performed in one clock cycle.

28. A method according to claim 20, wherein said step (d)(ii) comprises creating a table, said potential locations and said associated location indicators being stored in said table.

29. A method according to claim 20, wherein said first end of said sequence comprises the least significant bit of said sequence of data bits.

30. A method according to claim 20, wherein said steps (a) to (d)(ii) are performed in one clock cycle.

31. A method according to claim 20, comprising the further step of:
upon detection in step (d)(i) of no further occurrences of said predetermined value in said sequence of data bits, generating an end indicator; and
at the corresponding step (d)(ii), storing said end indicator as said location indicator.

32. A method according to claim 31, wherein said location indicators comprise a string of bits and said end indicator comprises a string of logic zero values of the same length as said string of bits.

33. A method according to claim 20, wherein said predetermined value is a logic one value.

34. A method according to claim 20, wherein at said step (c) each potential location within said sequence of data bits is identified.

35. A method according to claim 20, wherein at said step (c) each potential location except for the potential location furthest from the first end is identified.

36. A method according to claim 20, wherein said sequence of data bits comprises a vector specified within a vector instruction, and said location indicator indicates the position of said predetermined value in said vector.

37. A method of performing a block load from memory to a set of registers, wherein the registers to be loaded are identified by predetermined values in a sequence of data bits, the locations of the predetermined values being determined by a method according to claim 20.

38. A method according to claim 37 wherein two registers are loaded in one cycle.

39. A method of performing a block store to memory from a set of registers, wherein the registers to be stored in memory are identified by predetermined values in a sequence of data bits, the locations of the predetermined values being determined by a method according to claim 20.

40. A method according to claim 39 wherein two registers are stored in one cycle.

* * * * *